United States Patent
Weber et al.

(10) Patent No.: US 6,955,337 B2
(45) Date of Patent: Oct. 18, 2005

(54) PNEUMATIC MODULE

(75) Inventors: Alexis C. Weber, Chihuahua (MX);
Alejandro Moreno, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 208 days.

(21) Appl. No.: 10/406,112

(22) Filed: Apr. 3, 2003

(65) Prior Publication Data

US 2004/0195537 A1    Oct. 7, 2004

(51) Int. Cl.$^7$ ............................................. F16K 31/02
(52) U.S. Cl. ............... 251/129.15; 251/64; 137/315.03
(58) Field of Search ........................... 251/129.15, 64; 137/315.03

(56) References Cited

U.S. PATENT DOCUMENTS

| | | | | |
|---|---|---|---|---|
| 3,917,218 | A | * | 11/1975 | Marocco .................. 251/30.03 |
| 4,728,916 | A | * | 3/1988 | Fontecchio et al. ......... 335/255 |
| 4,830,333 | A | * | 5/1989 | Watson .................. 251/129.18 |
| 4,842,010 | A | * | 6/1989 | Edgecomb et al. ..... 251/129.15 |
| 4,901,974 | A | * | 2/1990 | Cook et al. ............ 251/129.15 |
| 4,988,074 | A | * | 1/1991 | Najmolhoda ........... 251/129.15 |
| 5,538,220 | A | * | 7/1996 | LaMarca ............... 251/129.15 |
| 5,611,370 | A | * | 3/1997 | Najmolhoda ........... 251/129.14 |
| 5,967,487 | A | * | 10/1999 | Cook et al. .................... 251/64 |
| 5,996,628 | A | * | 12/1999 | Najmolhoda et al. .. 251/129.18 |
| 6,409,145 | B1 | | 6/2002 | Fong et al. ............. 251/129.18 |
| 6,457,484 | B1 | * | 10/2002 | Najmolhoda ........... 137/315.03 |
| 6,539,971 | B2 | * | 4/2003 | Moreno et al. ........ 137/315.03 |
| 6,561,304 | B1 | | 5/2003 | Henry |
| 6,637,555 | B2 | | 10/2003 | Kruckemeyer et al. |

* cited by examiner

*Primary Examiner*—Eric Keasel
(74) *Attorney, Agent, or Firm*—Jimmy L. Funke

(57) ABSTRACT

A pneumatic module includes an actuator assembly and a manifold. The actuator assembly includes a main body having a bore, an armature, overmolded primary and secondary plates, a coil and a frame. The manifold includes a valve seat, a control port and a supply port. When the actuator is in a de-energized state, the armature is forced against the valve seat by a spring, sealing off the supply port from the control port. When the actuator is in an energized state, current flows through the coil, thereby generating a magnetic field. The magnetic field forces the armature to move toward the primary plate, causing the valve seat becomes unsealed. Once the valve seat is unsealed, fluid flow is permitted between the supply port and the control port. The one end of the armature has an endcap to minimize mechanical noise generated by movement of the armature against the spring. The frame surrounding the actuator assembly has flanges extending from both ends. These flanges correspond to wells located within the manifold. The flanges and wells are configured such that when the flanges are inserted into the wells, the actuator assembly can be twisted and locked into the manifold without requiring additional traditional fasteners, such as bolts or screws.

36 Claims, 2 Drawing Sheets

PNEUMATIC MODULE

BACKGROUND OF THE INVENTION

1. Technical Field

The present invention is directed generally to modules, and, in particular, to pneumatic modules.

2. Description of the Related Art

It is known to provide a pneumatic module configured to selectively control the flow of fluid from a first port to a second port, as seen by reference to U.S. Pat. No. 6,409,145 to Fong et al ("Fong"). Fong discloses an armature in combination with a valve seat to implement this fluid control. However, a problem generally encountered in the pneumatic module field involves providing a device to simultaneously meet the requirements of low internal leakage in both fluid flow directions, high operating pressure, low noise, low cost and ease of assembly. Pneumatic modules having low internal leakage in only one flow direction are inefficient in systems requiring effective sealing to prevent fluid backflow. Such internal leakage is often caused by the failure of the armature to make effective contact with the valve seat or when pressure forces act to unseal the armature. However, even those pneumatic modules having low internal leakage in both directions are often limited to use only in low pressure applications. The inability for such actuators to withstand higher pressures makes these actuators undesirable for high pressure environments. It is also desirable to reduce the mechanical noise generated when the armature contacts the valve seat. Finally, to make pneumatic modules more cost effective, they should be designed to eliminate steps in the assembly process and/or to eliminate unnecessary internal components.

Accordingly, there is a need for a pneumatic module that minimizes or eliminates one or more of the above-mentioned shortcomings.

SUMMARY OF INVENTION

One object of the invention is to provide a solution to the above mentioned requirements. One advantage of the present invention is that the inventive device has low internal leakage in both fluid flow directions while operating under high supply and/or control pressures. Another advantage of the present invention is that the valve seat is designed to optimize contact area with the armature for enhanced sealing capabilities. Another advantage of the present invention is the lower cost and the reduction of leak paths resulting from both replacing the traditional brass housing, such as a brass tube or a brass armature bearing, within the pneumatic module with a bobbin and/or armature bearing containing the overmolded primary and secondary plates and from eliminating the need to bolt an actuator assembly of the pneumatic module to a manifold portion thereof. Still another advantage is the simplified assembly process used to affix the actuator assembly to the manifold.

In one aspect of the invention, a pneumatic module is provided that includes an actuator assembly and a manifold. The actuator assembly includes a main body having a bore, an armature, a primary plate, a secondary plate, a coil, an electrical terminal and a frame. The manifold includes a valve seat, a control port and a supply port. When the actuator is in a de-energized state, a compressed spring forces the armature against the valve seat, sealing off the supply port from the control port. The end of the armature in contact with the valve seat has a seal configured to increase the actuator's ability to maintain low leakage in both flow directions relative to the known art. The valve seat is shaped such that it protrudes toward the bore. This arrangement improves the ability to maintain low leakage in both flow directions, especially from the control port to the supply port.

When the actuator is in an energized state, current flows through the coil, thereby generating a magnetic field. The magnetic field forces the armature away from the valve seat toward the primary plate. Once the armature moves sufficiently toward the primary plate, the valve seat becomes unsealed, thus allowing fluid flow between the supply port and the control port. An end of the armature proximate to the primary plate has an endcap to minimize and dampen the mechanical noise generated by the impact of the armature against the primary plate.

The frame surrounding the actuator assembly has flanges extending from both ends. These flanges correspond to wells located within the manifold. The flanges and wells are configured such that when the flanges are inserted into the wells, the actuator assembly can be twisted and locked into the manifold without the need for any tools, and without requiring additional traditional fasteners, such as bolts or screws.

In a second aspect of the invention, the actuator assembly further includes a manifold interface designed to simplify the affixation of the actuator assembly to the manifold by eliminating the need to align the actuator assembly with the proper ports on the manifold. This elimination is achieved by integrating the valve seat, the supply port and the control port into the manifold interface. When this actuator assembly is twisted and locked onto the manifold, the electrical terminal will be automatically properly positioned to interface with the manifold.

Other features, objects and advantages of the present invention will become apparent to one of ordinary skill in the art from the description that follows and may be realized by means of the instrumentalities and combinations particularly pointed out in the appended claims, taken in conjunction with the accompanying drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
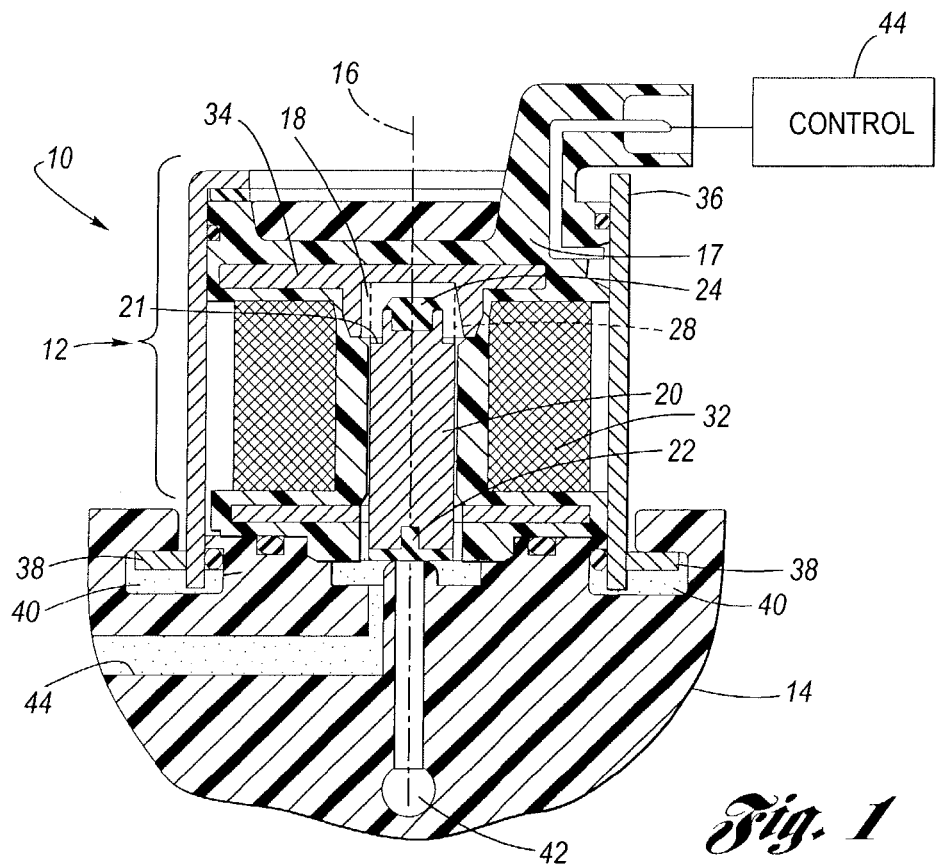
FIG. 1 is a cross sectional view of a first pneumatic module embodiment having an actuator assembly and a manifold.

Referring now to the drawings wherein like reference numerals are used to identify identical components in the various views, FIG. 1 illustrates one embodiment of a pneumatic module 10 having an actuator assembly 12 and a manifold 14. Actuator assembly 12 is generally configured for selective control of fluid flow through manifold 14. Manifold 14 is generally configured to provide the combination of input/output parts for allowing such fluid flow.

Actuator assembly 12 is centered about an axis 16 and has a main body 17 that is similarly centered about axis 16. Main body 17 has a blind bore 18 within which an armature 20 resides. Both bore 18 and armature 20 are centered about axis 16. Armature 20 is made from a ferromagnetic material and includes an annular shoulder 21. The shape of armature 20 can be altered to meet design requirements and thus is not limited to the exemplary shape illustrated in FIG. 1. Armature 20 extends along axis 16 within bore 18 and has a seal 22 and an endcap 24. Seal 22 and endcap 24 comprise pliant material which may be an elastomeric material. Seal 22 and endcap 24 are centered about axis 16. Seal 22 and endcap 24 may be affixed to armature 20 using an injection molding process; however, other methods of affixation can be used. Seal 22 is in selective intermittent contact with a valve seat 26 on manifold 14.

Actuator assembly 12 also has a coil 32 centered about axis 16. In the illustrated embodiment, when coil 32 is energized, an axial magnetic force acting on armature 20 will be established in the direction of a primary plate 34. Primary plate 34 comprises a ferromagnetic material and, in conjunction with secondary plate 30, armature 20 and a frame 36, is configured to establish flux paths for the magnetic flux generated by coil 32. Actuator assembly 12 further includes a spring 28, configured so as to be situated between annular shoulder 21 and the closed end of bore 18. Spring 28 is centered about axis 16 and preloads armature 20 with an axial force urging armature 20 towards a secondary plate 30. Secondary plate 30 comprises a ferromagnetic material. Actuator assembly 12 further includes a frame 36. Frame 36 comprises a ferromagnetic material and is generally annular, thus extending along the perimeter of actuator assembly 12. Frame 36, together with primary plate 34, secondary plate 30 and armature 20, establishes flux paths for the magnetic flux generated by coil 32. Frame 36 further includes flanges 38. Flanges 38 project radially outward from the main body of frame 36. Flanges 38, as will be described below, are configured to cooperate with corresponding features in manifold 14 to affix actuator assembly 12 and manifold 14.

Figure 2:
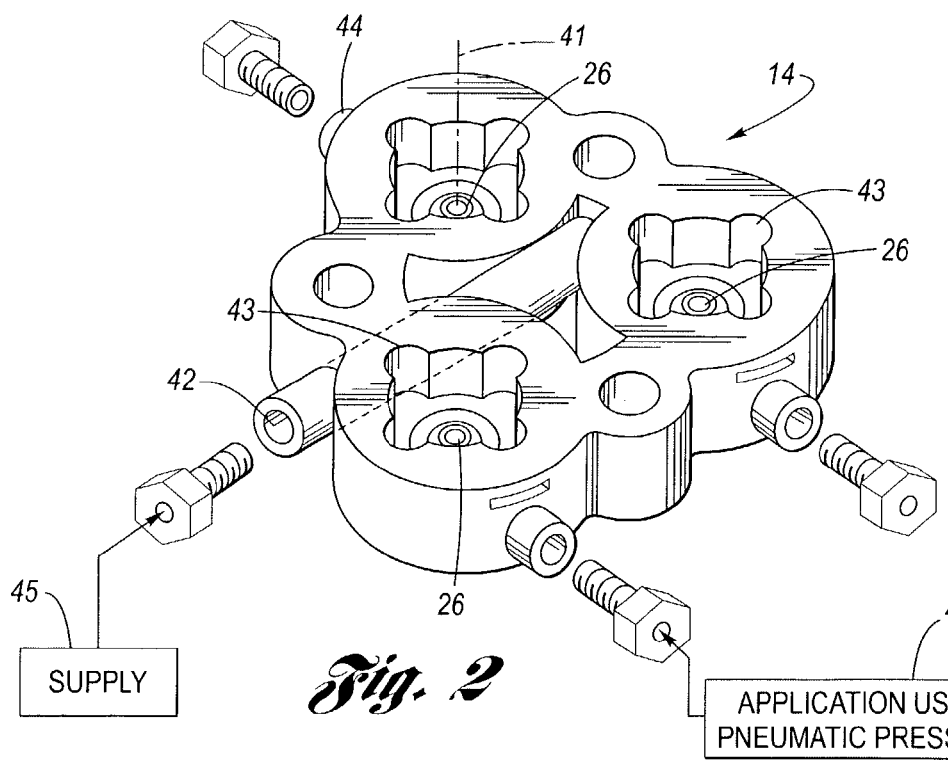
FIG. 2 is a perspective view of the manifold of FIG. 1 having flanges and an integrated valve seat, in accordance with the present invention.
Figure 3:
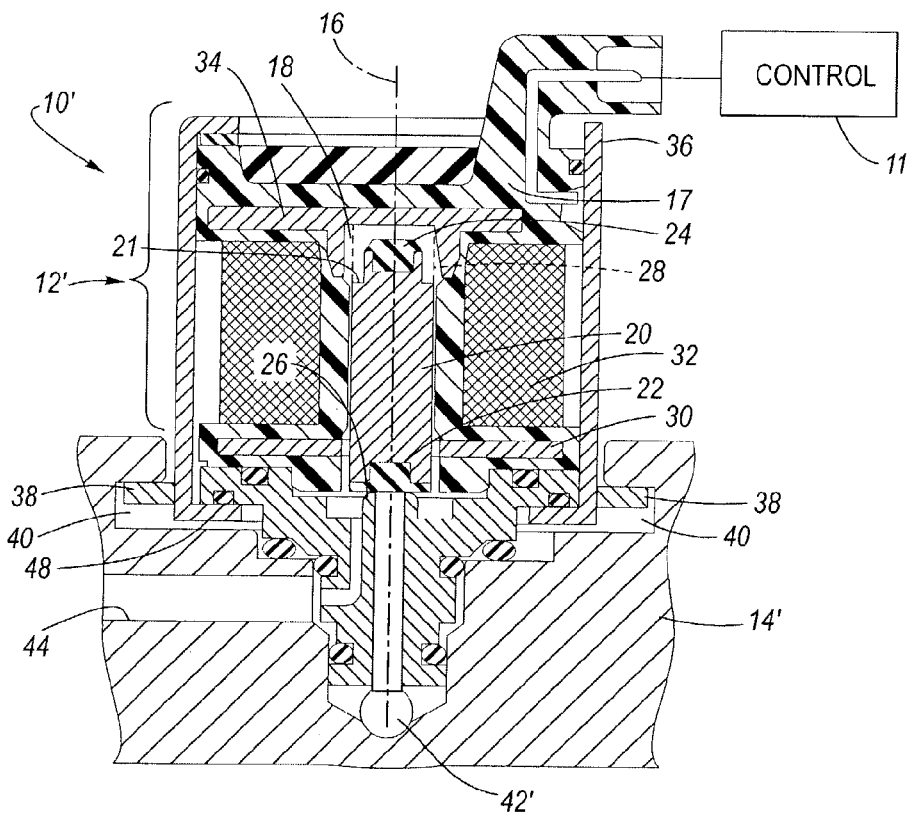
FIG. 3 is a cross section view of another pneumatic module embodiment having an actuator assembly that includes a manifold interface and a manifold.
Figure 4:
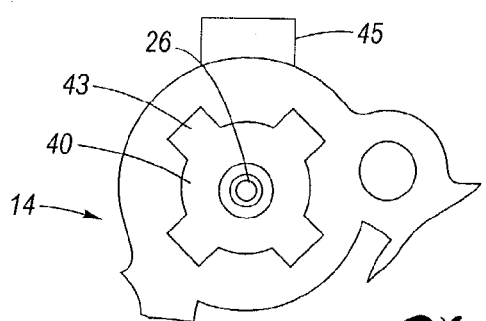
FIG. 4 is a cross sectional view of a single manifold well having flanges and an integrated valve seat in accordance with the present invention.

Manifold 14, best illustrated in FIG. 2 and FIG. 3, includes one or more wells 40 configured generally to receive a corresponding actuator assembly 12. Wells 40 includes a feature that is complementary to flanges 38 to allow for the affixation of actuator assembly 12 to manifold 14. Manifold 14 also has a supply port 42 that can be connected to a supply 45 to provide pneumatic pressure to actuator 10. Manifold 14 further includes a control port 44 for each actuator assembly 12 included in actuator 10. Control port 44 may be connected to a downstream application 47 that uses the pneumatic pressure. When actuator assembly 12 is assembled with manifold 14, valve seat 26 from actuator assembly 12 arcuately protrudes towards bore 18.

Referring again to FIG. 1, when actuator 10 is in a de-energized state, no current flows through coil 18. As a result, spring 28 presses armature 20 against valve seat 26, sealing off supply port 42 from control port 44. When actuator 10 is in an energized state, current supplied from an external source, such as control 11, flows through coil 18. This current flow induces magnetic flux, as described above. The resulting force exerted on armature 20, due to the magnetic fields so established, is configured to overcome the opposing force applied by spring 28. This condition causes the armature to move upwards within bore 18, wherein seal 22 is unseated from valve seat 26. That is, once armature 20 moves a sufficient distance toward primary plate 34, it will lose contact with valve seat 26, thereby allowing fluid to flow through supply port 42 and control port 44.

Referring to FIG. 3, an alternate embodiment of a pneumatic module according to the invention is shown, designated 10'. Actuator 10' has an actuator assembly 12' and a manifold 14'.

Actuator assembly 12' includes a frame 36' having flanges 38 to affix actuator assembly 12' to manifold 14'. Frame 36' also has crimping flanges 48, which are used to affix a manifold interface 46 to main body 17. Interface 46 can be integrated into main body 17 or it can be a separate component, as illustrated in FIG. 3. Interface 46 is configured to simplify the manufacturing process and to minimize valve leakage at the sub-assembly level. Interface 46 includes a valve seat 26' that is selectively sealed by seal 22 on armature 20. When valve seat 26' is selectively sealed, fluid flow from supply port 42' to control port 44', both of which are integrated into interface 46, is inhibited.

Figure 5:
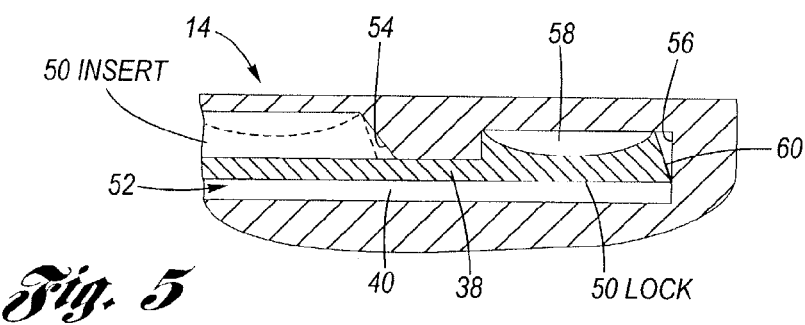
FIG. 5 is a cross sectional view illustrating the relationship between a flange on the actuator assembly to a well in the manifold.

Referring to FIG. 5, the relationship between flanges 38 and wells 40 is illustrated. A first twist-locking feature, flanges 38, and a second twist-locking feature, comprising receptacles 43, a passage 52, a graduated ramp 54 and a lock well 58, cooperate to define a twist-locking mechanism, as positively claimed. To ready actuator assembly 12 for twist-locking to manifold 14, axis 16 is aligned with an axis 41, best shown in FIG. 2, such that axis 16 and axis 41 are coincident. Furthermore, actuator assembly 12 is rotated such that flanges 38 are aligned to be received by receptacles 43, best shown in FIG. 3. Once flanges 38 are aligned for reception by receptacles 43, actuator assembly 12 is seated on manifold 14, allowing flanges 38 to be correspondingly seated in receptacles 43. Then actuator assembly 12 is rotated such that flanges 38 are placed at an initial insert position $50_{insert}$. The opening to a passage 52, through which flange 38 is rotated, is wider than flange 38, proximate to the opening, to allow for simplified guidance of flange 38 into passage 52. Graduated ramp 54 in passage 52 allows for precise placement of flange 38 within a lock well 58. After flange 38 passes through the narrowed opening of passage 52, the opening once again becomes wide; however, there is no graduated ramp to guide flanges 38 into final position in lock well 58. Instead the opening transitions from narrow to wide without the intermediate ramping, thus allowing flange 38 to snap into a final position $50_{lock}$ in lock well 58.

Because flange 38 is arcuately shaped, the endpoints of the arc contact the inner surface of lock well 58, thereby decreasing the tendency of flange 38 to move horizontally within lock well 58. To decrease the tendency of flange 38 to move vertically within lock well 58, teeth 60 can be added to the end of flange 38. Teeth 60 are in physical contact with a mechanical stop 56 within lock well 58. In addition, a component (not shown), such as a spring washer, can be added to flange 38 or manifold 14 to provide frictional resistance against flange 38 that minimizes the possibility of contaminating module 10 with metallic shavings.

From the foregoing, it can be seen that a new and improved pneumatic module has been brought to the art. It is to be understood that the preceding description of the preferred embodiments is merely illustrative of some of the many specific embodiments that represent applications of the principles of the present invention. Other arrangements would be evident to those skilled in the art without departing from the scope of the invention as defined by the following claims.

What is claimed is:

1. A pneumatic module, comprising:
   an actuator assembly having a main body, said main body including a blind bore having a longitudinal axis associated therewith, said actuator assembly further including an armature axially slidable within said bore, said main body including an overmold structure surrounding axially opposing sides and a radially-outermost side of a primary and a secondary plate of said actuator assembly to define said blind bore, said main body further including a frame having a plurality of radially outwardly projecting first flanges; and
   a manifold having at least one well correspondingly configured to cooperate with said first flanges to affix said actuator assembly to said manifold.

2. The module of claim 1 wherein said actuator assembly further includes a manifold interface having a supply port configured to cooperate with said armature to selectively regulate fluid flow, whereby said supply port is circumscribed by a valve seat.

3. The module of claim 2 whereby said manifold interface further includes a control port in selective communication with said supply port.

4. The module of claim 3 further including a magnetically energizable coil whereby when said coil is in a selectively de-energized state, a spring axially forces said armature to a closed position against said valve seat to thereby inhibit fluid flow between said control port and said supply port and whereby when said coil is in a selectively energized state, said armature travels axially away from said closed position to an open position.

5. The module of claim 2 whereby said frame further includes a plurality of radially inwardly projecting second flanges whereby said second flanges affix said manifold interface to said main body.

6. The module of claim 1 whereby said manifold further includes a supply port configured to cooperate with said armature to selectively regulate fluid flow, said manifold further having a control port in selective communication with said supply port, and whereby said supply port is circumscribed by a valve seat.

7. The module of claim 6 further including a magnetically energizable coil whereby when said coil is in a selectively de-energized state, a spring axially forces said armature to a closed position against said valve seat to thereby inhibit fluid flow between said control port and said supply port and whereby when said coil is in a selectively energized state, said armature travels axially away from said closed position to an open position.

8. The module of claim 6 wherein an elastomer seal is affixed to a first end of said armature and whereby said elastomer seal is selectively in contact with said valve seat.

9. The module of claim 8 wherein an elastomer endcap is affixed to a second end of said armature and whereby said elastomer endcap is selectively in contact with said primary plate.

10. The module of claim 1 wherein said plurality of first flanges on said frame are configured to cooperate with said manifold having corresponding wells to achieve twist-locking features affixing said main body to said manifold.

11. The module of claim 1 wherein said manifold includes a valve seat that is shaped such that it arcuately protrudes toward said blind bore in said main body to optimize contact area with an elastomer seal affixed to a first end of said armature.

12. A pneumatic module, comprising:
    an actuator assembly having a main body, said main body including a bore having a longitudinal axis associated therewith, said actuator assembly further including an armature axially slidable within said bore, said main body further including a frame having a plurality of radially outwardly projecting first flanges having a first twist lock feature associated therewith;
    a manifold having at least one well having a second twist lock feature complementary to said first twist lock feature wherein said first and said second features cooperate to achieve a twist locking affixation of said actuator assembly to said manifold;
    a manifold interface having a supply port configured to cooperate with said armature to selectively regulate fluid flow, whereby said supply port is circumscribed by a valve seat;
    wherein said frame further includes a plurality of radially inwardly projecting second flanges whereby said second flanges affix said manifold interface to said main body.

13. The module of claim 12 wherein said manifold interface further includes a control port in selective communication with said supply port.

14. The module of claim 13 further including a magnetically energizable coil whereby when said coil is in a selectively de-energized state, a spring axially forces said armature to a closed position against said valve seat to thereby inhibit fluid flow between said control port and said supply port and whereby when said coil is in a selectively energized state, said armature travels axially away from said closed position to an open position.

15. The module of claim 12 wherein an elastomer seal is affixed to a first end of said armature and whereby said elastomer seal is selectively in contact with said valve seat.

16. The module of claim 15 wherein an elastomer endcap is affixed to a second end of said armature and whereby said elastomer endcap is selectively in contact with a primary plate within said main body.

17. The module of claim 12 wherein said valve seat is shaped such that it arcuately protrudes toward said bore in said main body to optimize contact area with an elastomer seal affixed to a first end of said armature.

18. A pneumatic module, comprising:
    an actuator assembly having a main body, said main body including a bore having a longitudinal axis associated therewith, said actuator assembly further including an armature axially slidable within said bore, said main body further including a frame having a plurality of radially outwardly projecting first flanges;
    a valve seat disposed proximately to and protruding toward said bore to optimize contact area with sealing means affixed to a first end of said armature, said valve seat having a fluid passage therein, whereby said actuator assembly includes a closed position having said armature in selective contact with said valve seat to close said fluid passage, whereby said armature, being selectively axially movable from said closed position to an open position allowing, for selective fluid flow;
    a manifold having at least one well correspondingly configured to cooperate with said first flanges to affix said actuator assembly to said manifold;
    a manifold interface having a supply port configured to cooperate with said armature to selectively regulate fluid flow, whereby said supply port is circumscribed by said valve seat;

whereby said frame further includes a plurality of radially inwardly projecting second flanges whereby said second flanges affix said manifold interface to said main body.

19. The module of claim 18 further including a magnetically energizable coil whereby when said coil is in a selectively de-energized state, a spring axially forces said armature to said closed position against said valve seat to thereby inhibit fluid flow between a control port and said supply port and whereby when said coil is in a selectively energized state, said armature travels axially away from said closed position to said open position.

20. The module of claim 18 whereby said sealing means include an elastomer seal affixed to said first end of said armature whereby said elastomer seal is selectively in contact with said valve seat.

21. The module of claim 20 further including an elastomer endcap affixed to a second end of said armature, whereby said elastomer endcap is selectively in contact with a primary plate within said main body.

22. A pneumatic module, comprising:
actuator assembly means having a main body, said main body including a bore having a longitudinal axis associated therewith, said actuator assembly means further including armature means axially slidable within said bore, said actuator assembly means further including a primary and a secondary plate that are overmolded by said main body, said main body further including framing means having a plurality of radially outwardly projecting first flanges;
manifold means having at least one well correspondingly configured to cooperate with said first flanges to affix said actuator assembly to said manifold means;
manifold interface means having supply port means configured to cooperate with said armature means to selectively regulate fluid flow, whereby said supply support means are circumscribed by valve seat means;
wherein said framing means further include a plurality of radially inwardly projecting second flanges that affix said manifold interface means to said main body.

23. The module of claim 22 further comprising noise repression means affixed to an end of said armature means whereby said noise repression means contact said primary plate.

24. The module of claim 22 further comprising actuation means for selectively axially sliding said armature means toward said secondary plate.

25. The module of claim 22 wherein said manifold interface means further include control port means in selective communication with said support means.

26. The module of claim 22 wherein valve seat means is shaped such that it arcuately protrudes toward said bore in said main body to optimize contact area with sealing means affixed to a first end of said armature means.

27. The module of claim 22 wherein said plurality of radially outwardly projecting first flanges on said framing means are configured to cooperate with said manifold means having corresponding wells to achieve twist-locking features affixing said main body to said manifold means.

28. A pneumatic module, comprising:
actuator assembly means having a main body, said main body including a bore having a longitudinal axis associated therewith, said actuator assembly means further including an armature axially slidable within said bore and a primary and a secondary plate, said main body further including framing means having a plurality of radially outwardly projecting first flanges;
manifold means having at least one well correspondingly configured to cooperate with said first flanges on said framing means to achieve twist-locking features affixing said actuator assembly to said manifold;
manifold interface means having supply port means configured to cooperate with said armature means to selectively regulate fluid flow, whereby said supply port means are circumscribed by valve seat means;
wherein said framing means further include a plurality of radially inwardly projecting second flanges that affix said manifold interface means to said main body.

29. The module of claim 28 further comprising noise repression means affixed to an end of said armature means whereby said noise repression means contact said primary plate.

30. The module of claim 28 further comprising actuation means for selectively axially sliding said armature means toward said secondary plate.

31. The module of claim 28 wherein said manifold interface means further include control port means in selective communication with said supply port means.

32. The module of claim 28 wherein valve seat means is shaped such that it arcuately protrudes toward said bore in said main body to optimize contact area with sealing means affixed to a first end of said armature means.

33. A pneumatic module, comprising:
actuator assembly means having a main body, said main body including a bore having a longitudinal axis associated therewith, said actuator assembly further including armature means axially slidable within said bore and a primary and a secondary plate, said main body further including framing means having a plurality of radially outwardly projecting first flanges;
valve seat means disposed proximately to and protruding toward said bore to optimize contact area with sealing means affixed to a first end of said armature means, said valve seat means having fluid passage means therein, whereby said actuator assembly means include a closed position having said armature means in selective contact with said valve seat means to close said fluid passage means, whereby said armature means, being selectively axially movable from said closed position to an open position, allow for selective fluid flow;
manifold means having at least one well correspondingly configured to cooperate with said first flanges on said framing means to affix said main body to said manifold means;
manifold interface means having supply port means configured to cooperate with said armature means to selectively regulate fluid flow, whereby said supply port means are circumscribed by valve seat means;
wherein said framing means further include a plurality of radially inwardly projecting second flanges that affix said manifold interface means to said main body.

34. The module of claim 33 further comprising noise repression means affixed to an end of said armature means whereby said noise repression means contact said primary plate.

35. The module of claim 33 further comprising actuation means for selectively axially sliding said armature means toward said secondary plate.

36. The module of claim 33 wherein said manifold interface means further include control port means in selective communication with said supply port means.

* * * * *